US012571633B2

(12) United States Patent
Hattass et al.

(10) Patent No.: US 12,571,633 B2
(45) Date of Patent: Mar. 10, 2026

(54) SYSTEM AND METHOD FOR DETERMINING A FREQUENCY AND/OR FREQUENCY CHANGE OF A DRIVE OSCILLATION OF AN INERTIAL SENSOR

(71) Applicant: Robert Bosch GmbH, Stuttgart (DE)

(72) Inventors: Mirko Hattass, Stuttgart (DE); Thorsten Balslink, Kirchentellinsfurt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 342 days.

(21) Appl. No.: 18/481,609

(22) Filed: Oct. 5, 2023

(65) Prior Publication Data

US 2024/0151532 A1    May 9, 2024

(30) Foreign Application Priority Data

Nov. 7, 2022    (DE) ..................... 10 2022 211 691.7

(51) Int. Cl.
G01C 19/5712          (2012.01)
(52) U.S. Cl.
CPC ................................. G01C 19/5712 (2013.01)
(58) Field of Classification Search
CPC . G01C 19/5712; G01C 19/5776; G01P 21/00; G01P 21/02
See application file for complete search history.

(56) References Cited

U.S. PATENT DOCUMENTS

| | | | |
|---|---|---|---|
| 6,553,835 B1* | 4/2003 | Hobbs ................ | G01C 19/5607 73/514.16 |
| 10,914,585 B1 | 2/2021 | Sorenson et al. | |
| 2009/0007661 A1* | 1/2009 | Nasiri ..................... | G01P 1/023 73/504.03 |
| 2011/0285444 A1 | 11/2011 | Uemura et al. | |
| 2013/0239680 A1 | 9/2013 | Prandi et al. | |
| 2015/0123827 A1* | 5/2015 | Claus .................. | H03M 1/1255 341/122 |
| 2016/0341579 A1* | 11/2016 | Kimura .............. | G01C 19/5776 |
| 2018/0031597 A1* | 2/2018 | Oliaei ..................... | G01C 19/00 |
| 2018/0143217 A1* | 5/2018 | Liou .................... | G01C 22/006 |
| 2018/0156615 A1* | 6/2018 | Maeda ................ | G01C 21/183 |

(Continued)

FOREIGN PATENT DOCUMENTS

DE          102021201595 A1      8/2022

*Primary Examiner* — David J Bolduc
(74) *Attorney, Agent, or Firm* — NORTON ROSE FULBRIGHT US LLP

(57) ABSTRACT

A system having an inertial sensor and an evaluation unit. The inertial sensor is configured to excite an oscillatory structure of the inertial sensor to execute a drive oscillation, so that an output data rate of the inertial sensor is derived as a function of a frequency of the drive oscillation. The evaluation unit has a reference clock generator and is configured to ascertain the output data rate of the inertial sensor as a function of a reference frequency of the reference clock generator and to determine the frequency and/or frequency change of the drive oscillation as a function of the ascertained output data rate. Alternatively, the inertial sensor is configured to receive a reference clock signal of the reference clock generator from the evaluation unit and to determine the frequency and/or frequency change as a function of the transmitted reference clock signal.

10 Claims, 1 Drawing Sheet

(56)     References Cited

U.S. PATENT DOCUMENTS

| | | | |
|---|---|---|---|
| 2019/0285663 A1* | 9/2019 | Chino | ...................... G01P 15/18 |
| 2020/0033825 A1* | 1/2020 | Otani | ................. G05B 19/0423 |
| 2021/0364294 A1* | 11/2021 | Lammel | .............. G01C 25/005 |
| 2022/0390235 A1* | 12/2022 | Visconti | ............ G01C 19/5776 |

* cited by examiner

SYSTEM AND METHOD FOR DETERMINING A FREQUENCY AND/OR FREQUENCY CHANGE OF A DRIVE OSCILLATION OF AN INERTIAL SENSOR

CROSS REFERENCE

The present application claims the benefit under 35 U.S.C. § 119 of German Patent Application No. DE 10 2022 211 691.7 filed on Nov. 7, 2022, which is expressly incorporated herein by reference in its entirety.

FIELD

The present invention relates to a system consisting of an inertial sensor and an evaluation unit and on a method for determining a frequency and/or frequency change of a drive oscillation of an inertial sensor.

BACKGROUND INFORMATION

Inertial sensors, in particular angular rate sensors, are frequently realized by micromechanical oscillators. In angular rate sensors, an elastically mounted mass is excited resonantly to execute a drive oscillation, and the Coriolis forces acting as a result of the external rotation are detected via deflections of the mass running perpendicular to the drive oscillation. The Coriolis force is defined by the speed $v$ of the mass and the external angular rate $\Omega$ present:

$$F_{coriolis} = -2v\Omega$$

Since this is at least approximately a harmonic oscillation, the Coriolis force can also be expressed by the drive amplitude $x_0$ and the oscillation frequency $\omega$:

$$F_{coriolis} = -2x_0\omega\Omega.$$

On the basis of this expression, it is immediately apparent that in the event of a changes in the frequency $\omega$, a changed Coriolis force also occurs, so that the frequency of the oscillation has direct effects on the amplitude of the measurement signal. Changes in the oscillation frequency occur inter alia due to the influence of the environmental conditions, such as the ambient temperature or mechanical stresses acting on the component. A common concept for compensating the temperature influence is to adjust the sensors with the aid of a temperature measurement. However, such approaches have various disadvantages. For example, in conventional systems for this purpose, the temperature measurement is carried out by means of a physical temperature sensor integrated on the ASIC (application-specific integrated circuit). However, the temperature sensor is decoupled from the oscillatory micromechanical system (MEMS) via an adhesive, so that, in the event of a rapid temperature change or as a result of a temperature gradient in the sensor, temperature differences between the ASIC and MEMS can occur, and the compensation of temperature effects becomes correspondingly inaccurate.

It would therefore be desirable to enable a more direct measurement of the oscillation frequency, which allows more accurate compensation of the (expected) deviations compared to indirect methods such as temperature measurement etc.

SUMMARY

It is an object of the present invention to provide a system and a method with which the oscillation frequency of the movable structure of an inertial sensor can be ascertained and, if necessary, the deviations caused by a frequency change can be compensated.

In the system according an example embodiment of the present invention, the frequency of the sensor-internal oscillator is ascertained with the aid of the reference clock generator of the evaluation unit. Compared with the related art, a first alternative disclosed herein allows the frequency to be determined via the output data rate coupled to the oscillation frequency, while a second alternative disclosed herein allows the reference clock signal of the evaluation unit to be provided to the sensor for ascertaining the oscillation frequency. The reference clock is provided in both cases by the evaluation unit, in particular by a processor that processes the data of the sensor, for example, or by a further electronic circuit. The evaluation unit in this case measures the time rate of the output data received by the sensor on the basis of the time base provided by the reference clock generator or provides this time base to the sensor by transmission of the reference clock signal. In contrast, a reliable measurement of the oscillation frequency solely on the basis of the means provided in the sensor would only be possible to a limited extent, in particular since the system clock of the sensor is typically derived from the natural frequency of the micromechanical oscillator in the systems from the related art. Therefore, an internal measurement refers to itself, and the frequency can correspondingly be determined only indirectly. In contrast, the with the aid of the system according to an example embodiment of the present invention, the user of the sensor has the possibility of determining the sensor-internal frequency (or its change with respect to a reference value) on the basis of the output data rate and, if necessary, carrying out a compensation on the basis of this information (or transmitting the ascertained internal frequency to the sensor and enabling a more accurate compensation in the sensor itself). Alternatively, the evaluation unit can transmit the reference clock to the sensor so that the sensor can internally carry out a referenced evaluation of the output data rate.

Since the internal system clock of the sensor is derived from the MEMS oscillator frequency, but typically the output data rate is defined by a specification (which is in particular predefined by the specific use), the data rate is usually set to the target value once by setting a fixed frequency divider during the final measurement of the sensor. If changes in the internal oscillation frequency occur, these directly affect the data rate. These fluctuations are typically within the specifications of the output data rate but are nevertheless measurable (in the range of a few per thousand). The processor that processes the sensor data typically has a very accurate frequency reference (usually in the form of a quartz oscillator), which enables accurate measurement of the data rate.

According to an example embodiment of the present invention, the inertial sensor is in particular an angular rate sensor which is configured to excite the oscillatory structure to execute the drive oscillation and to detect a detection oscillation running perpendicular to the drive oscillation. Alternatively, the inertial sensor can also be an acceleration sensor. In particular, the inertial sensor has a control unit that is configured, for example, to control an amplitude of the drive oscillation and/or to generate the detection data from a measurement signal. The evaluation unit can in particular be a processor that receives the output data of the sensor via a data connection and processes them further. The sensor and the evaluation unit can in particular be arranged spatially separately (or arrangeable spatially separately), or the evaluation unit can be part of a sensor device together with the sensor.

The output data rate is the time rate at which new output data can be transmitted from the sensor to the evaluation unit or are provided. If the data transmission takes place in a synchronized manner from the sensor to the evaluation unit, the inverse of the time period between the sending of successive data blocks corresponds to the output data rate. In particular, the inertial sensor is configured such that the output data rate is defined by frequency division of a sensor-internal clock signal, and the sensor-internal clock signal is in turn generated as a function of the drive oscillation. In particular, the inertial sensor is configured to detect the drive oscillation by means of a deflection signal and to generate a sensor-internal clock signal as a function of the deflection signal or to synchronize the sensor-internal clock signal with the deflection signal.

Advantageous embodiments and developments of the present invention are disclosed herein.

The system according to the present invention allows in particular a correction of the raw data ascertained by the sensor, by means of which the influence of the changed oscillation frequency on the detection data of the sensor is compensated. The correction values can, for example, be ascertained in the evaluation unit as a function of a correction model. Alternatively, these correction models could already be stored in the sensor, and the sensor carries out this compensation on the basis of the frequency (determined by the sensor itself or transmitted by the processor).

According to a preferred embodiment of the present invention, the evaluation unit is configured to correct detection data of the inertial sensor as a function of the ascertained frequency and/or frequency change. The detection data are the measurement signal of the physical variable detected by the sensor, in particular of the angular rate or acceleration present at the sensor. For example, a difference between the ascertained frequency and a reference value stored in the evaluation unit can be calculated for the correction, and the correction can be carried out as a function of this difference (i.e., the frequency change). Alternatively, the correction can also take place directly as a function of the ascertained frequency. For example, a plurality of frequencies and/or frequency changes (or output data rates and/or changes in the output data rate) can be stored in a memory of the evaluation unit with one or more associated correction values, which are applied to the detection data after the frequency and/or frequency change has been ascertained.

According to a further preferred embodiment of the present invention, the inertial sensor is configured to correct detection data of the inertial sensor as a function of the frequency and/or frequency change. The frequency and/or frequency change that is used to correct the sensor data can be determined by the sensor itself as a function of the transmitted reference clock signal or transmitted by the evaluation unit. In particular, therefore, the evaluation unit is configured to transmit the ascertained frequency and/or frequency change to the inertial sensor. In the latter embodiment, the function of the evaluation unit thus consists in ascertaining the frequency and/or frequency change with the internal reference clock generator and returning the result to the sensor, and the correction itself is subsequently carried out inside the sensor.

According to an example embodiment of the present invention, the evaluation unit and/or the inertial sensor are preferably configured to correct the detection data by adapting the sensitivity, the offset, or further parameters of the inertial sensor. The sensitivity of the sensor corresponds to the ratio of the variable measured by the sensor and the output measurement signal and usually represents a value that is stored in the sensor or the evaluation unit and is read out and applied for the calculation of the detection data. By adapting the sensitivity, the sensor or the evaluation unit is able to perform a correction of the raw data on the basis of the ascertained frequency (deviation) in a relatively simple way.

According to a preferred embodiment of the present invention, the system has a further inertial sensor, wherein the evaluation unit is configured to correct detection data of the further inertial sensor as a function of the ascertained frequency and/or frequency change. In particular, the inertial sensor whose output data rate is ascertained is an angular rate sensor, and the further sensor is an acceleration sensor. In particular, the inertial sensor and the further inertial sensor are part of a sensor package. In this embodiment, the frequency change in the (first) inertial sensor can be used to detect environmental or other interfering influences on the sensor system and to correct the detection data of the further inertial sensor accordingly. For example, the frequency change of the inertial sensor can be used as a measure of the stresses present in the package, and the ascertained frequency and/or frequency change can be used to perform corrections in an acceleration sensor likewise present in the package.

According to a preferred embodiment of the present invention, the system has at least one further sensor, in particular a temperature sensor, and/or a moisture sensor and/or a bending sensor, wherein the evaluation unit is configured to receive detection data of the further sensor and to carry out a consistency check as a function of the detection data of the further sensor and the ascertained frequency and/or frequency change of the drive oscillation, wherein the evaluation unit is in particular further configured to detect a malfunction of the system by the consistency check. In this way, a plausibility check of the frequency with, for example, an internal temperature measurement is made possible. If inconsistencies occur here, this can serve as an indication of a malfunction, so that the ascertainment of the frequency and/or frequency change can be used as an additional monitoring criterion in the context of functional safety.

The present invention also relates to a method. All design possibilities and advantages described above with respect to the system according to the present invention apply to the method according to the present invention, and vice versa. In particular, the system is configured to carry out the method according to the present invention and/or embodiments of the method according to the present invention.

According to a preferred embodiment of the method according to the present invention, in a further step detection data of the inertial sensor are corrected as a function of the ascertained frequency and/or frequency change, wherein the correction takes place in particular as a function of a correction model. In particular, an adaptation of the sensitivity, the offset, or further internal parameters can be carried out using the correction model. In addition to the ascertained output data rate, further variables, which are detected in particular by additional sensors, can also be included in the correction model.

According to an example embodiment of the present invention, the correction model is preferably formed as a function of operating data of the inertial sensor, in particular wherein at least one external stimulus acts on the inertial sensor under a plurality of different operating conditions, and the operating data comprise detection data generated during the action of the external stimulus and associated output data rates of the inertial sensor. The external stimulus is generated in particular in a controlled manner, for example by subjecting the inertial sensor to rotations and/or accelerations in a test device. Alternatively, it can also be a stimulus occurring or present in the particular application. Based on a known external stimulus and the detection data, the deviations caused by the operating conditions can be determined and the corresponding correction values can be ascertained.

Particularly preferably, according to an example embodiment of the present invention, the different operating conditions are detected by at least one further sensor, in particular a temperature sensor, and/or a moisture sensor and/or a bending sensor, and the operating data for forming the correction model comprise sensor data of the at least one further sensor. In this embodiment, the correction model is, in particular, trained in the application by setting up a data model in correlation with further sensors (temperature, moisture, bending, etc.), for example. The true sensitivity values can be extracted, for example, via suitable algorithms from the movement data (e.g. use of the 1G standard in conjunction with an acceleration sensor). Thus, during use in controllable situations, a model can be set up which can be applied later in less controllable situations. The correction model is in particular formed in an automated manner, i.e., detection data of the inertial sensor together with sensor data of the further sensor or of the further sensors are collected and stored in an automated manner during operation. On the basis of these stored operating data, a statistical model for the relationship between the frequency (or output data rate) and the correction values necessary for the compensation of the environmental influences, for example, can then be set up. The correction model can be formed, for example, by machine learning. The evaluation unit is preferably configured to collect operating data in an automated manner and to form and/or further improve the correction model as a function of the collected operating data.

Exemplary embodiments of the present invention are illustrated in the figures and explained in more detail in the following description.

DETAILED DESCRIPTION OF EXAMPLE EMBODIMENTS

Figure 1:
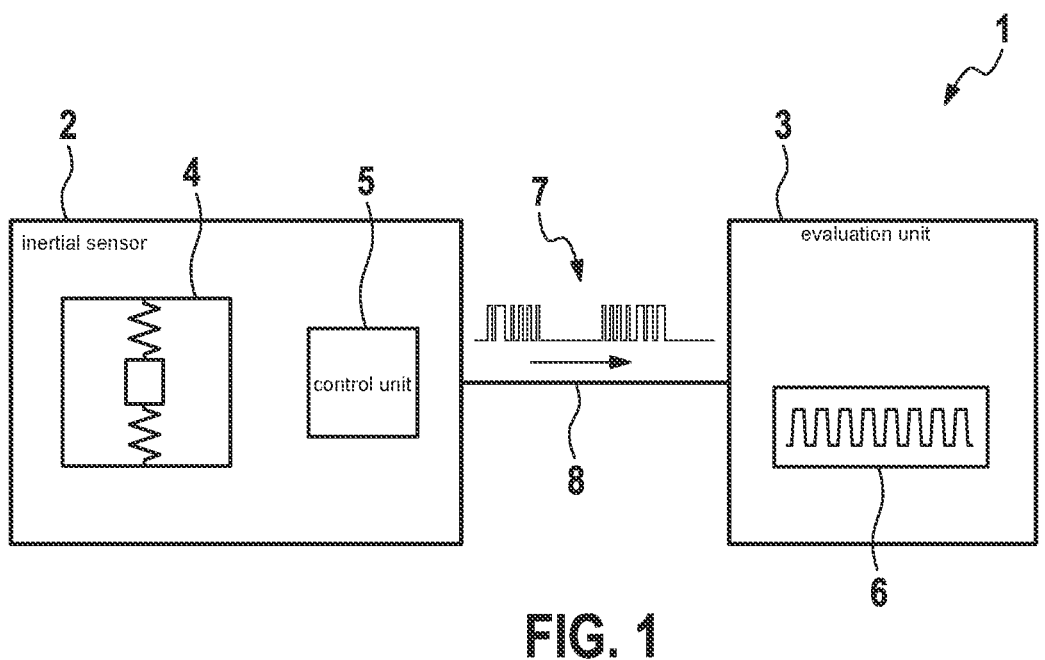
FIG. 1 shows a schematic illustration of an example embodiment of the system according to the present invention.

FIG. 1 shows the schematic construction of an embodiment of the system 1 according to the present invention. The system 1 is composed of an inertial sensor 2 designed as an angular rate sensor and an evaluation unit 3, which is connected to the sensor 2 via a data connection 8. The angular rate sensor 2 has a movable micromechanical structure 4, which can be deflected in two mutually perpendicular directions (drive direction and detection direction) and excited to oscillate. The drive oscillation can be driven by electrostatic forces, for example, wherein the amplitude of the drive oscillation is controlled by the control unit 5 of the sensor 2.

If an external angular rate is now present at the sensor 2, the oscillating mass of the MEMS structure 4 experiences a Coriolis force perpendicular to the rotational axis and to the direction of the drive oscillation. The amplitude of the deflection in the detection direction can be detected by capacitive structures and processed by the control unit 5 into output data 7, which are transmitted to the evaluation unit 3 (indicated by the arrow) and are used by the latter to determine the angular rate present at the sensor 2. At a given drive frequency and amplitude, in the simplest case, the amplitude of the detection oscillation is proportional to the angular rate present, wherein the ratio of a measurement variable (angular rate) and the measurement signal is defined by the sensitivity of the sensor 2. However, if a change in the oscillation frequency of the structure 4 occurs, for example due to temperature influences or mechanical stresses, the oscillating mass experiences a correspondingly weaker or stronger Coriolis force, and the associated change in the measurement signal leads to reduced accuracy of the sensor 2.

The time rate at which the output data 7 of the sensor are transmitted to the evaluation unit 3 is based on a sensor-internal system clock derived from the frequency of the drive oscillation. Without an independent timer, a determination of the oscillation frequency within the sensor 2 is not possible directly. In the system 1 according to the present invention, use is instead made of the fact that the evaluation unit 3 has a reference clock generator 6 with which the output data rate of the sensor 2 can be ascertained, so that the fluctuation of the oscillation frequency itself can be deduced from the fluctuations of the output data rate coupled to the frequency of the drive oscillation. Alternatively, the reference clock signal of the reference clock generator can be transmitted from the evaluation unit 3 to the sensor 2, so that a time base for determining the frequency is provided to said sensor. For this purpose, the evaluation unit 3 is configured to carry out the steps, shown in FIG. 2, of an embodiment of the method according to the present invention.

The synchronization of the evaluation unit 3 for ascertaining the output data rate takes place, for example, in that the sensor 2—for example the control unit 5 of the sensor 2—sends a trigger signal to the evaluation unit 3, so that the output data rate of the evaluation unit 3 is known. Alternatively, an embodiment of the synchronization is also possible in which the evaluation unit 3 queries quasi continuously (i.e., with a comparatively high frequency in comparison with the output data rate) whether new output data are present in the sensor 2, so that the evaluation unit 3 can also deduce the output data rate as a result.

Figure 2:
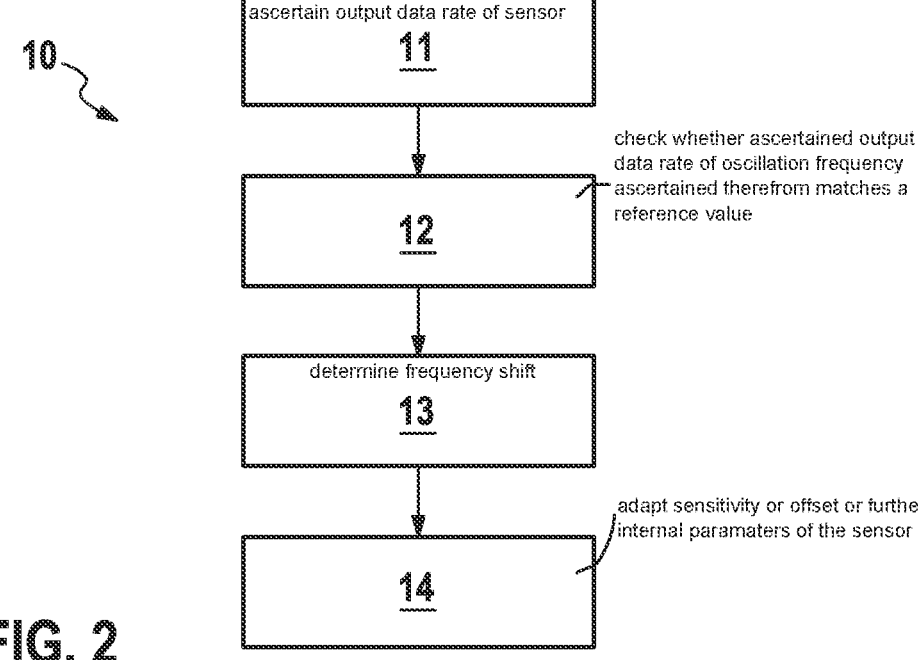
FIG. 2 illustrates the time sequence of an example embodiment of the method according to the present invention.

The method 10 shown schematically in FIG. 2 is used to determine a frequency and/or frequency change of the drive oscillation of the angular rate sensor 2 and subsequently to correct the detection data ascertained by the angular rate sensor 2. For this purpose, the method has a total of four steps 11, 12, 13, 14. In the first step 11, the output data rate of the sensor 2 is ascertained by synchronization of the sensor 2 with the evaluation unit 3. In the second step 12, the evaluation unit 3 checks with the aid of the frequency clock generator 6 whether the ascertained output data rate or the oscillation frequency ascertained therefrom matches a reference value. If the frequency of the drive oscillation is shifted relative to the intended setpoint value, a corresponding shift of the output data rate relative to the reference value results, and therefore the deviation of the output data rate is a direct measure of the frequency shift. In the third step 13, the frequency shift is determined by the evaluation unit on the basis of this relationship, and in the subsequent fourth step 14, for example, the sensitivity or the offset or further internal parameters of the sensor 2 are adapted such that the deviation of the measured values caused by the frequency shift is compensated.

Alternatively, the frequency and/or frequency change can be determined in that a reference clock signal of the reference clock generator 6 is transmitted from the evaluation unit 3 to the inertial sensor 2 first, and the frequency and/or frequency change is then determined with the aid of the transmitted reference clock signal by the sensor 2 itself.

What is claimed is:

1. A system, comprising:
an inertial sensor; and
an evaluation unit;
wherein the inertial sensor is configured to excite an oscillatory structure of the inertial sensor to execute a drive oscillation, so that an output data rate of the inertial sensor is derived as a function of a frequency of the drive oscillation, and wherein the evaluation unit has a reference clock generator;
wherein the system is configured to:
transmit output data from the inertial sensor to the evaluation unit,
ascertain the output data rate of the inertial sensor, using the evaluation unit, as a function of a reference frequency of the reference clock generator, and
determine the frequency of the drive oscillation and/or a frequency change of the drive oscillation, using the evaluation unit, as a function of the ascertained output data rate,
and/or the system is configured to:
to transmit a reference clock signal of the reference clock generator from the evaluation unit to the inertial sensor, and
to determine the frequency of the drive oscillation and/or a frequency change of the drive oscillation, using the inertial sensor, as a function of the transmitted reference clock signal.

2. The system according to claim 1, wherein the evaluation unit is configured to correct detection data of the inertial sensor as a function of the ascertained frequency and/or frequency change.

3. The system according to claim 1, wherein the inertial sensor is configured to correct detection data of the inertial sensor as a function of the ascertained frequency and/or frequency change.

4. The system according to claim 2, wherein the evaluation unit and/or the inertial sensor are configured to correct the detection data by adapting a sensitivity or an offset value of the inertial sensor.

5. The system according to claim 1, wherein the system has a further inertial sensor, wherein the evaluation unit is configured to correct detection data of the further inertial sensor as a function of the ascertained frequency and/or frequency change.

6. The system according to claim 1, wherein the system has at least one further sensor including a temperature sensor and/or a moisture sensor and/or a bending sensor, wherein the evaluation unit is configured to receive detection data of the further sensor and to carry out a consistency check as a function of the detection data of the further sensor and the ascertained frequency and/or frequency change of the drive oscillation, and wherein the evaluation unit is further configured to detect a malfunction of the system based on the consistency check.

7. A method for determining a frequency and/or frequency change of a drive oscillation of an inertial sensor, wherein the inertial sensor is configured to excite an oscillatory structure of the inertial sensor to execute the drive oscillation and to control an output data rate of the inertial sensor in an open-loop or closed-loop manner as a function of a frequency of the drive oscillation, wherein the method comprises the following steps:
transmitting output data of the inertial sensor to the evaluation unit,
ascertaining the output data rate of the inertial sensor, using the evaluation unit, as a function of a reference frequency of a reference clock generator, and
determining the frequency of the drive oscillation and/or a frequency change of the drive oscillation as a function of the ascertained output data rate,
or the method comprises the following steps:
transmitting a reference clock signal of the reference clock generator from the evaluation unit to the inertial sensor, and
determining the frequency of the drive oscillation and/or a frequency change of the drive oscillation, using the inertial sensor, as a function of the transmitted reference clock signal.

8. The method according to claim 7, further comprising:
correcting detection data of the inertial sensor corrected as a function of the ascertained frequency and/or frequency change, wherein the correction takes place in as a function of a correction model.

9. The method according to claim 8, wherein the correction model is formed as a function of operating data of the inertial sensor, wherein at least one external stimulus acts on the inertial sensor under a plurality of different operating conditions, and the operating data include detection data generated during an action of the external stimulus and associated output data rates of the inertial sensor.

10. The method according to claim 9, wherein the different operating conditions are detected by at least one further sensor including a temperature sensor and/or a moisture sensor and/or a bending sensor, and the operating data for forming the correction model include sensor data of the at least one further sensor.

* * * * *